A. WUNDERLICH.
MOTOR FLYING MACHINE.
APPLICATION FILED JAN. 27, 1908.

952,167.

Patented Mar. 15, 1910.
7 SHEETS—SHEET 1.

Witnesses
F. Stern
E. Schallinger

Inventor
Alfred Wunderlich
by B. Singer
Attorney

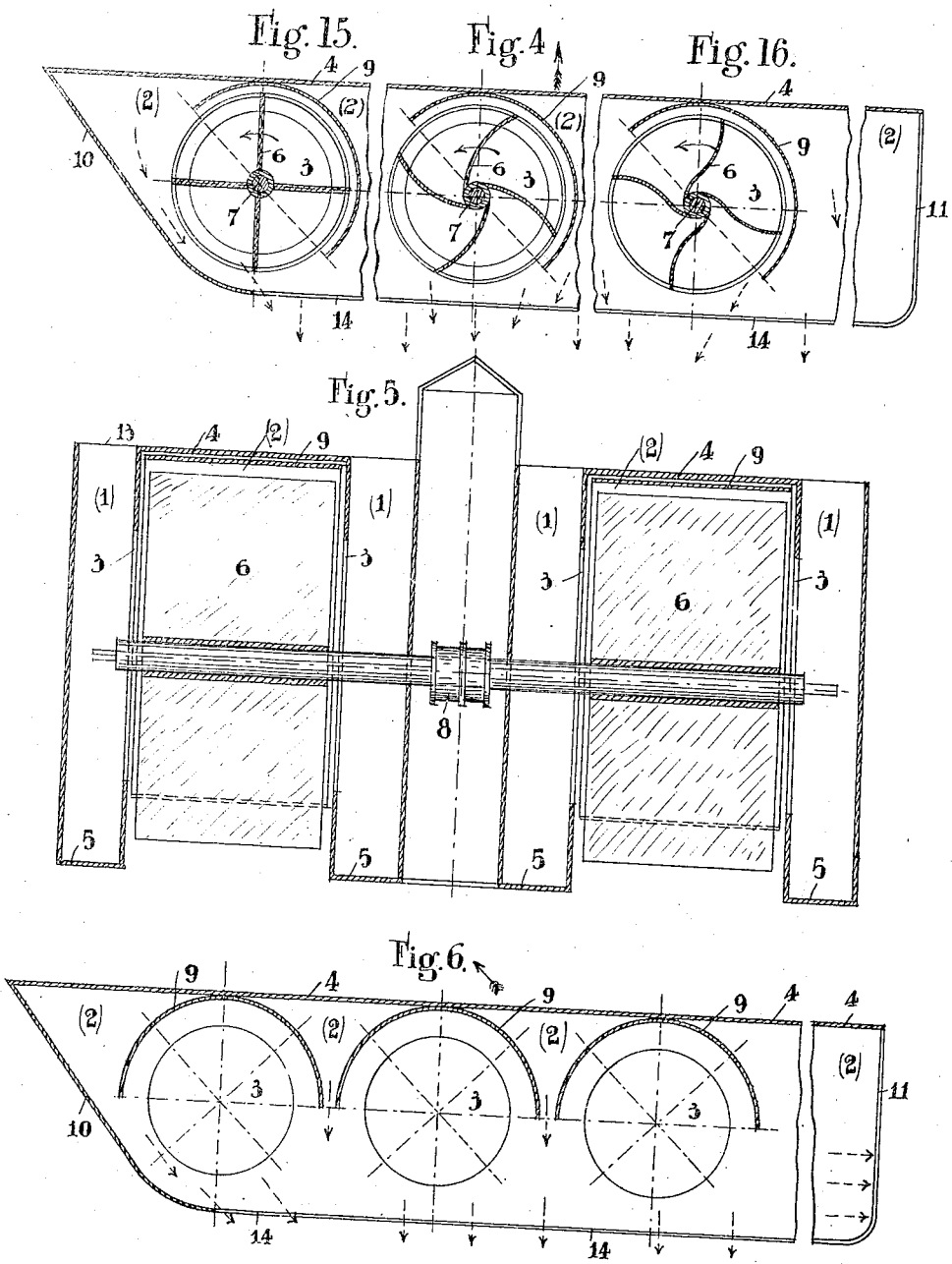

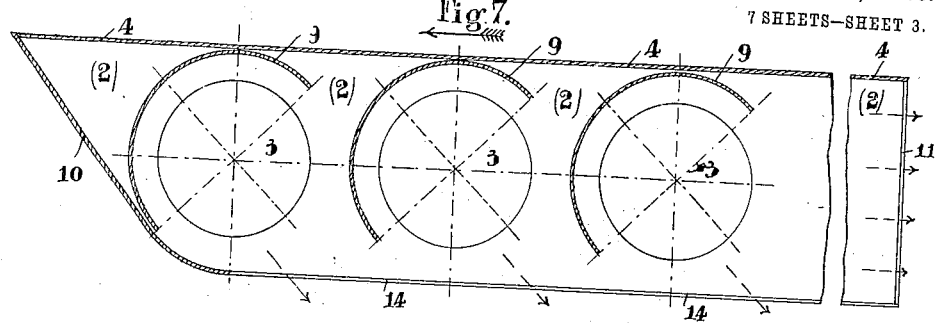
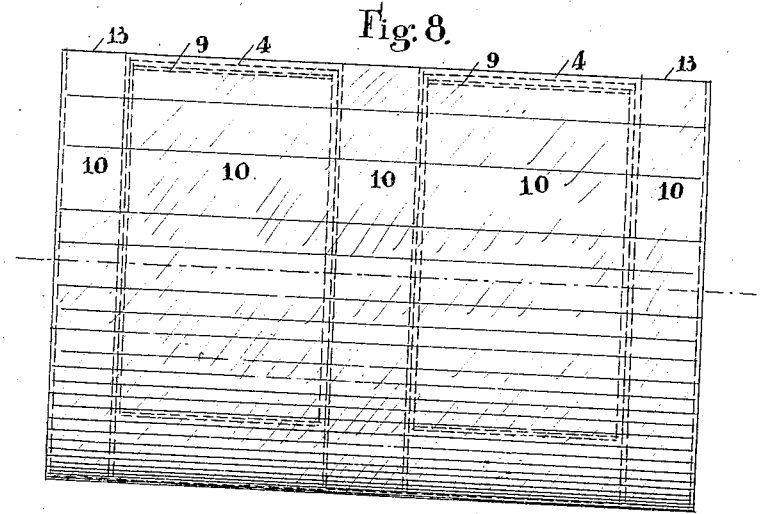
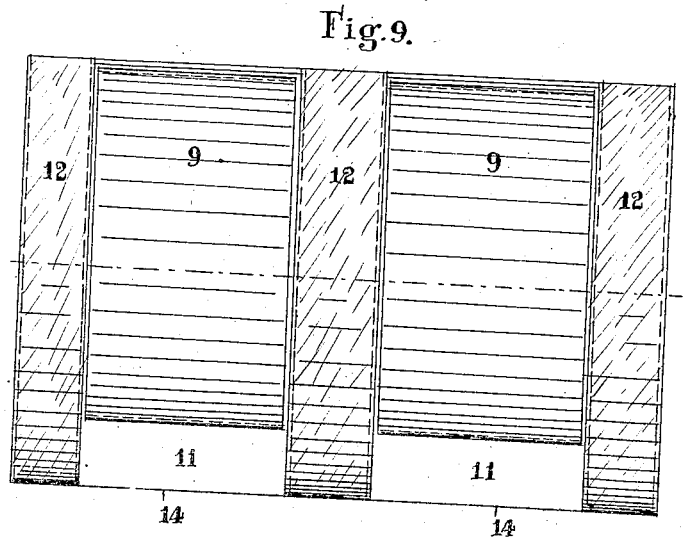

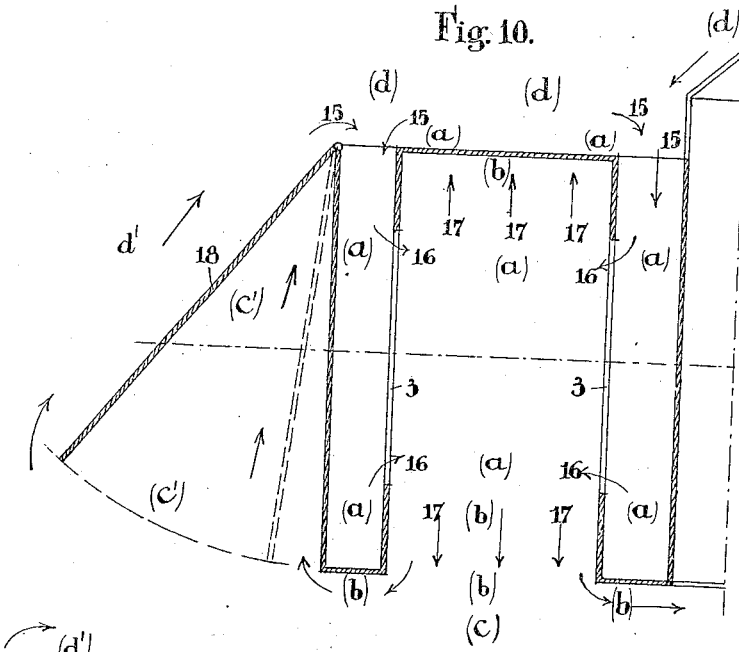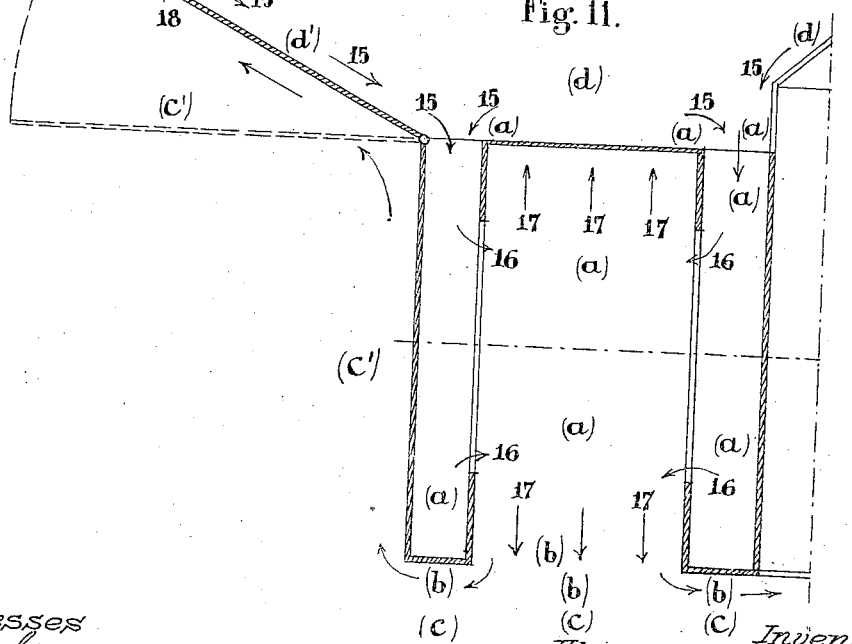

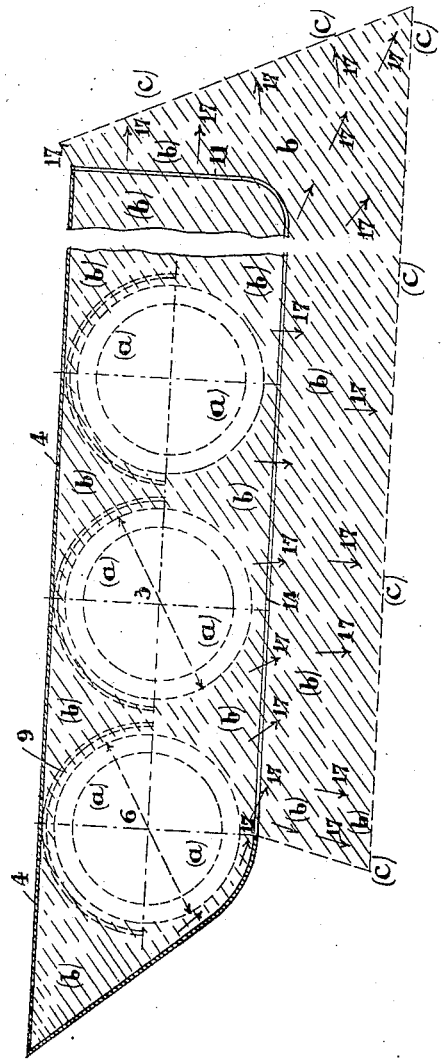

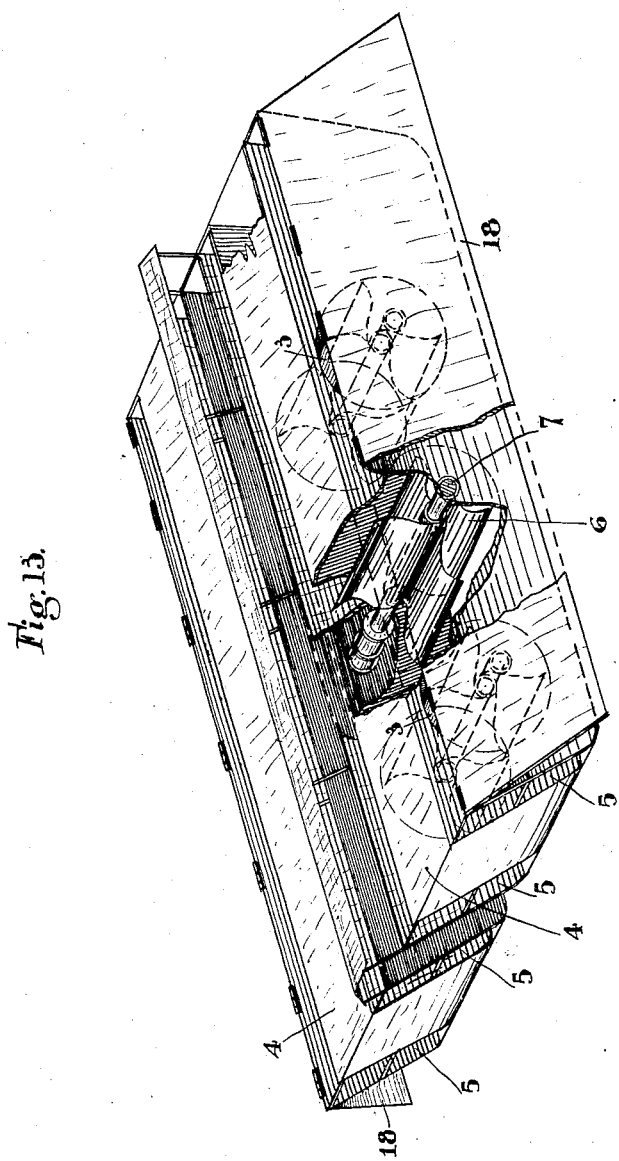

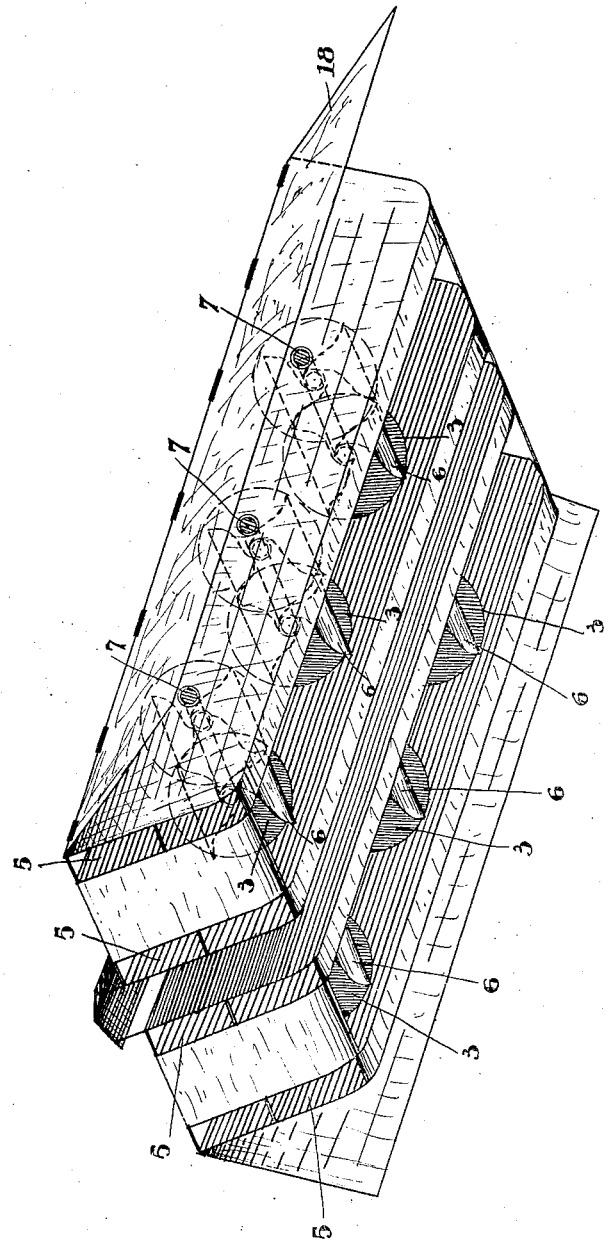

UNITED STATES PATENT OFFICE.

ALFRED WUNDERLICH, OF BRUSSELS, BELGIUM.

MOTOR FLYING-MACHINE.

952,167.  Specification of Letters Patent.  Patented Mar. 15, 1910.

Application filed January 27, 1908. Serial No. 412,859.

*To all whom it may concern:*

Be it known that I, ALFRED WUNDERLICH, engineer, a subject of the German Emperor, and residing at Brussels, Belgium, have invented new and useful Improvements in and Relating to Motor Flying-Machines; and I do hereby declare the following to be a full, clear, and exact description of the same.

This invention relates to motor operated air ships.

Objects of the invention are to provide mechanism in an air ship, by which the air pressure in the different portions of the apparatus and in the zones of air surrounding the ship is varied, so that an ascending movement may be imparted to the apparatus.

The accompanying drawings illustrate by way of example the details and the structure of various embodiments of the invention.

Figure 1:
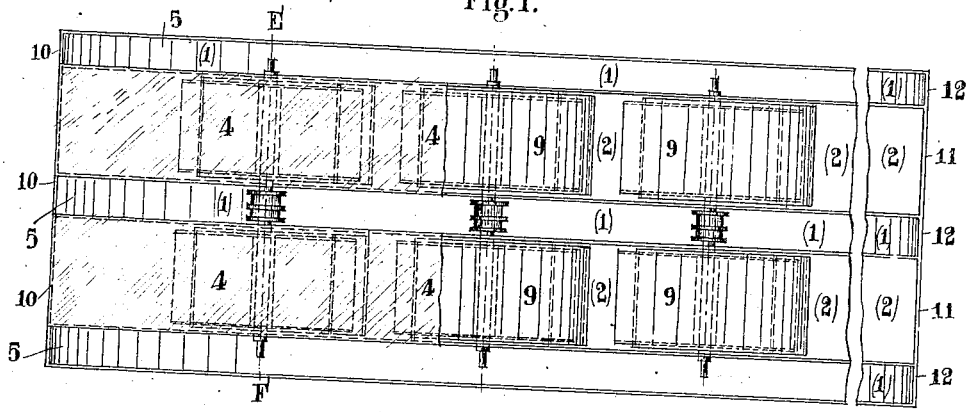
Figure 2:
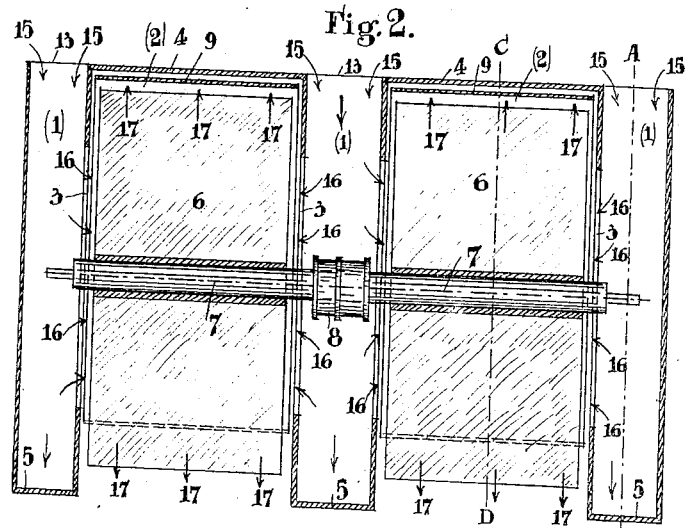
Figure 3:
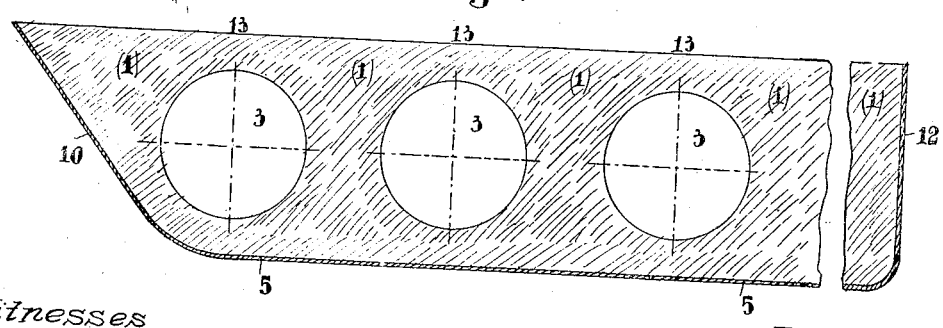

In the drawings Figure 1 is a top plan view of the flying apparatus, wherein portions of top members are omitted for the purpose of showing interior parts more clearly. Fig. 2 is a transverse section on line E—F of Fig. 1. Fig. 3 is a longitudinal section on line A—B of Fig. 2. Fig. 4 is a portion of a longitudinal section on line C—D of Fig. 2. Fig. 5 is a transverse section of a modified embodiment of this invention. Fig. 6, is a longitudinal section through the body of the air ship, similar to Fig. 4, certain parts being shown in a different position and other parts being omitted. Fig. 7 is a longitudinal section similar to Figs. 4 and 6, certain portions being shown in a different position. Fig. 8 is a front elevation of the flying apparatus shown in Fig. 1, wherein rotatory parts are omitted. Fig. 9 is a rear elevation of the same. Fig. 10 is a transverse section of a modified flying apparatus. Fig. 11 is a transverse section of the same showing certain parts in a different operative position. Fig. 12 is a longitudinal section, showing diagrammatically how pressure and suction zones are produced in the air which surrounds the apparatus. Fig. 13 is a perspective view of the flying machine with certain parts omitted to show the interior of the machine. Fig. 14 is a similar view to Fig. 13, showing the flying machine from the bottom. Fig. 15 is a portion of a longitudinal section, showing a modification of the parts shown in Fig. 4. Fig. 16 is another longitudinal section, showing another modification of the parts shown in Fig. 4.

Similar reference characters designate similar parts in all drawings.

The motor driven flying apparatus comprises a casing, which is divided into a plurality of juxtaposed longitudinal chambers 1 and 2. Chambers 1, as shown in Figs. 1 and 2, are open on top and closed at the bottom, while chambers 2 are closed on top and open at the bottom. Adjacent chambers communicate with each other by means of lateral apertures 3. Rotary wings 6 are mounted on shafts 7 in chambers 2, to which a high speed rotation may be imparted by means of the driving pulleys 8 or these shafts may be attached directly to some motor.

By the rotation of the wings 6 air is drawn from the chambers 1 into chambers 2 by way of the apertures 3. The air in the last named chambers is then somewhat compressed through the rotating wings and forced downwardly upon those bodies of air, which are below the bottom closing members 5 and upwardly against the top closing members 4.

The rotatory wings 6 may have various shapes, as shown in Figs. 4, 15 and 16 wherein straight wings and wings of different curvature are illustrated.

For the purpose of imparting motions to the air in the chambers 2 in different directions, preferably semi-circular casings 9 are provided, which are advisably adjustable, by swinging them about the shafts 7. In Fig. 4 these controlling casings are shown as directed toward the rear of the apparatus, in Fig. 6 they are adjusted in their vertical center position and in Fig. 7 they are swung toward the front of the apparatus.

The front wall of the apparatus is partly closed, as indicated by 10 in Figs. 4, 6, 7 and 8.

By reference to Figs. 2, 4, 5, 6, 7 and 9, it will be noted that the chambers 2 are not provided with rear walls and with bottoms, so that the air ship presents partly closed front walls and top walls, and partly closed bottom and rear walls.

The chambers 1 are closed in the rear by the wall portions 12, but they are left open at the top at 13, see Figs. 2, 3 and 8. The pressure chambers 2 are left open at their lower end at 14, as well as at their rear end 11.

When rotating motion is imparted to the wings 6, so that half of them rotate at a very high speed in a direction opposite to the direction of the other half, then air above the top closing members 4 is drawn by suction into the chambers 1, as indicated by arrows 15 and from there it is conveyed by suction through the apertures 3 into the chambers 2, as indicated by arrows 16. In the last named chambers the air is thrown in all directions through centrifugal force and it is thereby compressed. By this means two distinctly different zones of air are obtained within the interior of the casing; one of them being formed by rarefied air and the other one by compressed air, the two zones are separated by an intermediate zone, wherein the two aforementioned zones gradually pass into each other. Means are also provided for obtaining two distinctly different zones of air on the outside of the casing.

In the embodiment illustrated by Figs. 10 and 11 lateral wings 18 are shown for the purpose of utilizing to an increased extent the sustaining effect of the aforementioned combination of suction and compression.

In Figs. 10 and 11 the zones of rarefied air in chambers 1 and close to the axis of the wings 6 in compartments 2 are designated with ($a$), while the zones of compressed air are designated with ($b$) in the interior of the casing and close to the bottom at the outside thereof. The intermediate zone between zone 6 and the air of atmospherical pressure below the casing is designated with ($c$), and the corresponding intermediate zone above the apparatus with ($d$).

The lateral wings 18 may be adjusted by suitable means in downwardly inclined, horizontal or upwardly inclined position. By this means two additional separate zones ($c'$) and ($d'$) may be obtained. These expansion zones ($c'$) and ($d'$) are intermediate between the bodies of compressed air below and the bodies of rarefied air above and on the outside of the casing.

When the controlling casings 9 are adjusted to the position shown in Fig. 4 the re-active forces exerted upon the forwardly inclined front wall 10 and upon the concave surface of the controlling casings 9 counterbalance each other, so that the only effective force acts upon the inside surface of the top closing members 4 in upward direction, imparting thereby an ascending motion to the flying apparatus. When the controlling casings are in the position shown in Fig. 6 the two re-active forces will counter-balance each other and the apparatus will ascend and simultaneously it will advance, the two motions being combined in an upwardly directed incline. If the controlling casings 9 are in the position shown in Fig. 7 the apparatus will advance without ascending.

I claim—

1. A motor flying machine comprising in combination a hull divided longitudinally into a plurality of alternating pressure and suction chambers in juxtaposition, walls separating said chambers, said walls being provided with apertures, means adjacent to said apertures and disposed in said pressure chambers exclusively for drawing air from said suction chambers, said means being adapted to compress the air in said pressure chambers, and means for imparting arbitrary direction to the compressed air.

2. A motor flying machine comprising in combination a hull divided longitudinally into a plurality of alternating pressure and suction chambers in juxtaposition, walls separating said chambers, said walls being provided with apertures, transversely rotary means adjacent said apertures and disposed in said pressure chambers for drawing air from said suction chambers, said means being adapted to compress the air in said pressure chambers.

3. A motor flying machine comprising in combination, a hull divided longitudinally into a plurality of alternating pressure and suction chambers, said pressure chambers being closed on top and open at the bottom and rear end, said suction chambers being open on top and at the front and closed at the bottom and rear end, walls separating said chambers, said walls being provided with apertures, means adjacent said apertures for drawing air from said suction chambers and compressing the same in said pressure chambers.

4. A motor flying machine comprising in combination, a hull divided longitudinally into a plurality of alternating pressure and suction chambers, walls separating said chambers, said walls being provided with apertures, a plurality of transversely rotary wings disposed in said pressure chambers and adjacent said apertures, the direction of rotation of half the number of said wings being opposite the direction of rotation of the other half thereof, and said wings in their rotation being adapted to draw air from said suction chambers into said pressure chambers and compress the same therein.

5. A motor flying machine comprising in combination, a hull divided longitudinally into a plurality of alternating pressure and suction chambers, walls separating said chambers, said walls being provided with apertures, a plurality of rotary shafts extending transversely through said apertures, each of said shafts extending through all of said pressure chambers, wings mounted on said shafts, and adjustable covers for peripheral portions of said wings.

In testimony whereof, I have signed my name to this specification in the presence of two subscribing witnesses.

ALFRED WUNDERLICH.

Witnesses:
　CHARLES HOOVER,
　GREGORY PHELAN.